United States Patent [19]

Gray, Jr.

[11] Patent Number: 4,491,212
[45] Date of Patent: Jan. 1, 1985

[54] PICKER'S AID

[76] Inventor: Frank L. Gray, Jr., 4548 - 6th Pl., Gary, Ind. 46403

[21] Appl. No.: 402,516

[22] Filed: Jul. 28, 1982

[51] Int. Cl.³ .............................................. B65G 11/10
[52] U.S. Cl. ........................................ 193/7; 56/340; 383/16; 383/904
[58] Field of Search ...................... 193/7, 255; 56/340; 383/6, 10, 16, 41, 119, 127, 904

[56] References Cited

U.S. PATENT DOCUMENTS

| | | | |
|---|---|---|---|
| 1,624,308 | 4/1927 | Brown | 193/7 X |
| 2,437,461 | 3/1948 | Faulkner | 193/7 |
| 2,712,335 | 7/1955 | Houldsworth | 193/7 X |
| 2,943,432 | 7/1960 | Colon | 383/41 X |
| 3,326,345 | 6/1967 | Staffend et al. | 193/7 |
| 3,684,072 | 8/1972 | Castrellon | 193/7 |

Primary Examiner—Jeffrey V. Nase

[57] ABSTRACT

Apparatus for aiding a picker in harvesting fruit and like items, including a closed container releasably secured to the picker's side at the thigh and having a crush-resistant, flexible hose of a large diameter compared to the item to be picked connecting into the container. The hose and its free end are releasably secured to the arm and hand of the picker. A funnel member partly surrounds the hand, with the hand passing into the funnel area through a side opening in the funnel member. The side opening closely surrounds the wrist so as to prevent any loss of fruit through it. The funnel member connects with the free end of the hose. The rim of the funnel is releasably secured to open between the upper wrist and smallest finger so that the thumb and main fingers of the hand can readily pick fruit and like items and propel or drop them into the funnel, wherefrom they may roll or fall through the hose and into the container. Two such apparatus are shown, one secured to each side and arm of a picker, so that he may pick with both hands simultaneously. The containers, when full, can be easily emptied or replaced to continue the harvesting.

6 Claims, 5 Drawing Figures

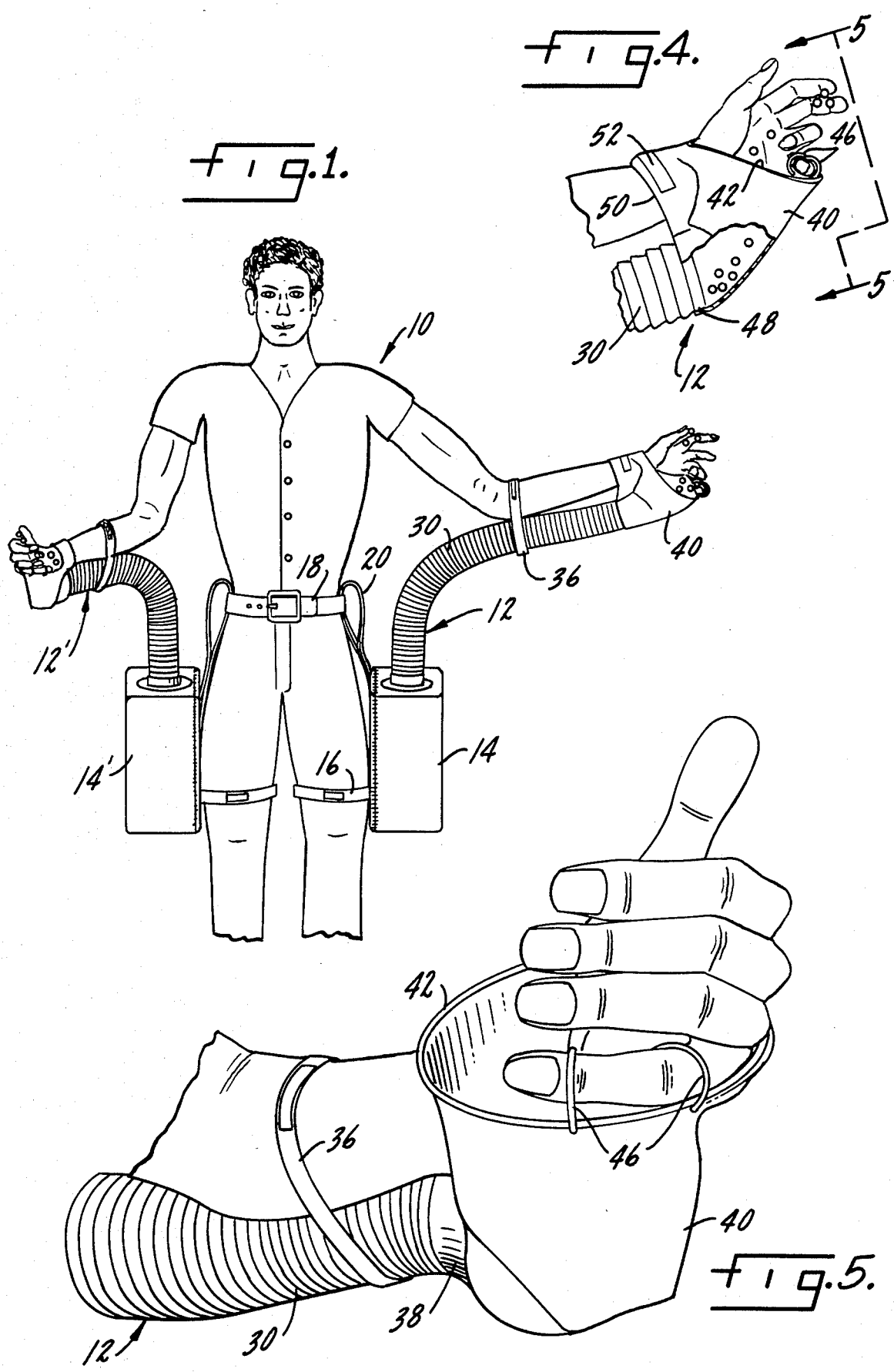

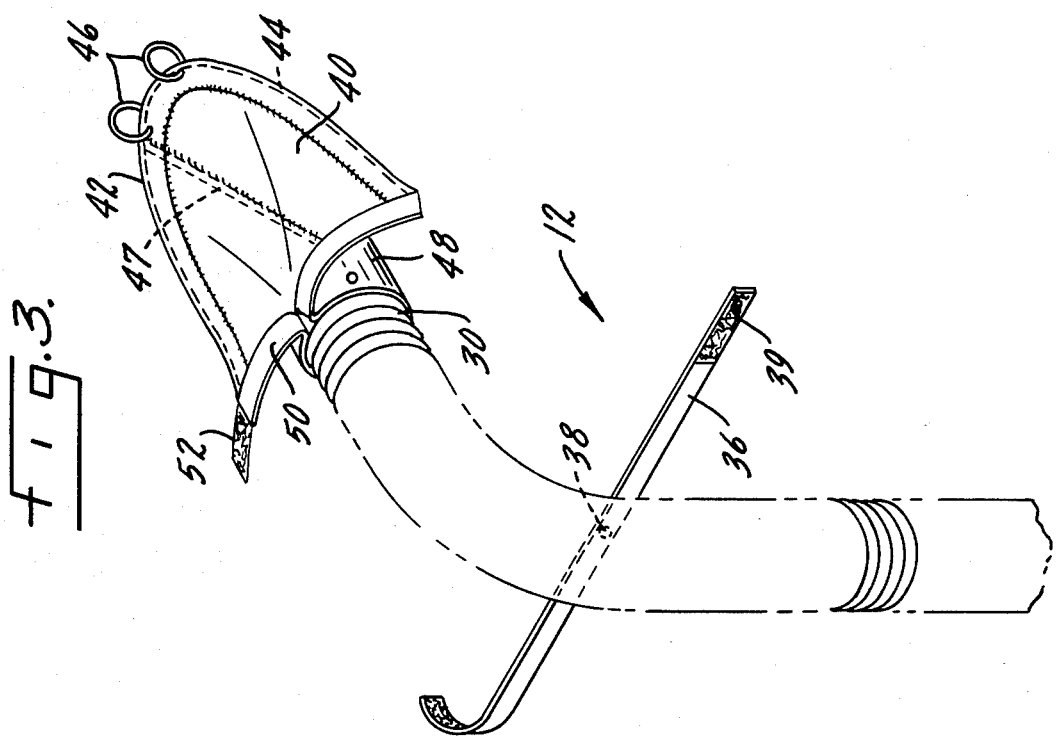
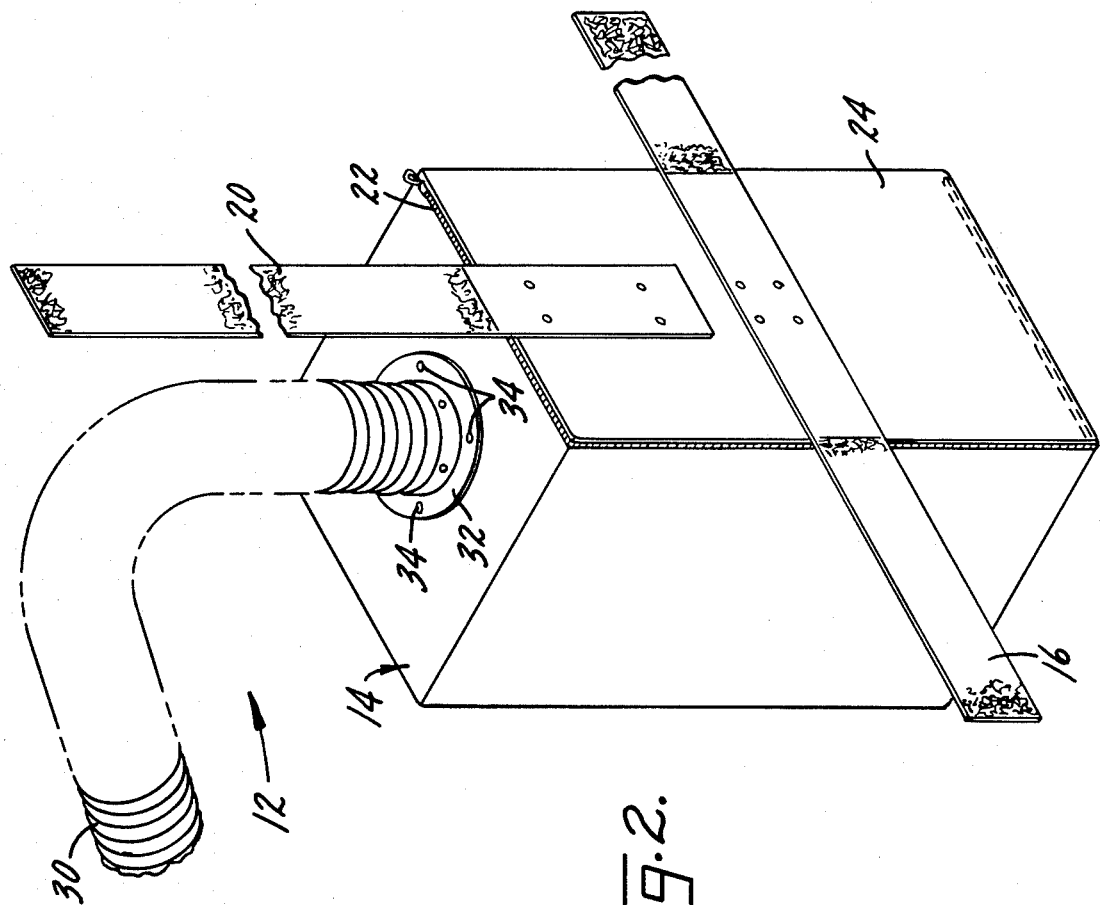

PICKER'S AID

FIELD OF THE INVENTION

The present invention relates to a new and novel picker's aid apparatus and more particularly to such apparatus for wear by the picker to aid in the harvesting of fruit and like small items.

BACKGROUND OF THE INVENTION

Harvesting of fruit, especially small fruit such as blueberries, is primarily done by hand labor using baskets and shoulder sacks. While mechanical devices to aid the picker have been suggested in the past, e.g., those of U.S. Pat. Nos. 160,341 (1875), 186,921 (1877), and 3,326,345 (1967), these have not gained much popularity, perhaps because of a tendency for the fruit to become hung up in the cloth sleeves or jammed in rigid tubing, and because of the difficulty of use of aids employing cloth sleeves, especially with wet or juicy fruits or in wet weather conditions, and the tendency of these aids to hinder the natural picking articulation of the human hand.

SUMMARY OF THE PRESENT INVENTION

A picker's aid device constructed in accordance with the present invention comprises a funnel member that has an exit opening and a rim which serves as its entry. Means for receiving the rim about the hand from the smallest finger to the wrist are provided so that the thumb and primary fingers are not tied to the rim but may be extended above the rim. Further the entry is held open by support means, e.g. a wire, incorporated in the funnel between the rim and the exit, so that the fruit may be easily and naturally picked and dropped into the funnel by the hand with the thumb and primary finger not being materially impeded by the funnel.

The invention, together with the advantages thereof, may best be understood by reference to the following description taken in connection with the accompanying drawings, in the several figures of which like reference numerals identify like elements.

BRIEF DESCRIPTION OF THE DRAWINGS

FIG. 1 is a perspective view of a picker with the picker's aid apparatus, constructed in accordance with the present invention.

FIG. 2 is a perspective view of the container part of the apparatus of FIG. 1.

FIG. 3 is a perspective view of the hand portion of the apparatus of FIG. 1.

FIG. 4 is a side view of the hand portion of FIGS. 1 and 3 in the hand of a user, with parts cut away to show internal construction.

FIG. 5 is an end view of the hand portion of FIGS. 1, 3, and 4 and seen from the line 5—5 of FIG. 4, when looking in the direction of the arrows.

DETAILED DESCRIPTION OF THE DRAWINGS

Referring to FIG. 1, there is depicted a picker 10 with picker's aid apparatus constructed in accordance with the present invention and generally designated 12 and 12'. Although one unit 12 or 12' might be emloyed, it is an advantage of the present invention that two may be used, one for each hand. We will describe in detail the unit 12, it being understood that the unit 12' may be essentially identical in construction.

The aid 12 has a container 14 which is closed and preferably made of pliable but firm plastic. The closed container 14 is secured to the left thigh by means of a strap 16 and to a belt 18 by a strap 20. As better seen in FIG. 2, the belts 16 and 20 are preferably fastened with Velcro so as to be adjustable to fit the user. As is also better seen in FIG. 2, the rectilinear container 14 is preferably openable by means of a zipper or other suitable closure 22, which preferably extends along three adjacent edges of one side 24 so as to allow the side 24 to be hinged open along the other side and provide full access to the interior of the container.

One preferred container is the double-walled, insulated plastic container of about 8" by 8" by 14" high, sold and popularly used for keeping canned drinks and other items cool. This construction would also allow the picked fruit to be kept cool.

However, the basic requirement for the container is that it be closed to the fruit or item picked. Thus it may be small mesh or porous. In some applications it is envisioned that thin plastic bags or liners be used and tied up and replaced when full.

In accordance with one feature of the present invention, a transversely crush-resistant elongated flexible lightweight hose 30 is provided which is connected at 32 to have one end open into the upper interior of the container 12.

The hose 30 is compressible and expandable lengthwise and has a large diameter relative to the item to be picked. A highly suitable example of such a hose 30 for use in picking blueberries and like-sized fruit is the commercially available coil-reinforced three-inch (3") plastic hose commonly used for an exhaust duct for ventilators and clothes dryers. Such a hose readily compresses lengthwise to one-tenth or less of its extended length, but because of the coil reinforcing, strongly resists transverse closure and crushing. For larger diameter fruit, hoses of larger diameter are readily available. The hose is preferably sized to extend approximately three-and-a-half (3 and ½) feet. Such a length will easily accommodate the average-sized picker picking from waist to shoulder-high bushes. Of course, the length may be varied to meet individual requirements and picking situations.

The hose 30 may be secured at 32 by any suitable means. Since it and the container 14 are both preferably made primarily of plastic, they may be welded together, preferably with a plastic support collar and perhaps with reinforcing plastic rivets 34 as shown.

While the hose 30 has been disclosed and depicted as having a leakproof plastic surface, and such is the desired construction, it should be noted that its surface need only be closed to the fruit picked so as to guide it to the container 12, and may be made porous to air or water. However, the conventional air- and watertight plastic hose 30 is very lightweight and its waterproof, non-absorbent and low-friction interior surface is especially advantageous in picking and moving juice-containing fruit with a minimum of mess and problems.

The other end of the hose 30 is, as is best seen in FIG. 3, an arm strap 36, preferably of plastic, and affixed to the underside of the hose preferably by a plastic rivet 38 and sonic welding. This strap 36 is preferably adjustable to fit about the arm of the picker (FIG. 1) by means of the Velcro fastener 39 as shown in FIG. 3.

In accordance with one feature of the present invention, the end of the hose 30 opposite from that attached to the container 12, is attached to a funnel 40. The preferred construction of the funnel 40 is best shown in FIGS. 3 through 5, it being understood that the particular funnel 40 depicted and disclosed is for the left hand and that the one for the right hand would be of identical but mirror-image construction. The funnel 40 is preferably made of waterproof fabric and has an upper rim 42 that includes a spring wire 44 reinforcement. A pair of spaced-apart little finger rings 46 are connected through the rim and surround the wire 44, and extend above the rim 42 for receiving the little finger of the left hand of the user.

To maintain the funnel open, a reinforcing, arcing spring wire 47 may be enclosed in the funnel fabric between the bottom of the opening of the hose 30 and the rim 42.

The base 48 of the funnel 40 forms circular, fruit-tight seal about the end of the hose 30 where it is secured by a suitable adhesive or welded in place to provide a smooth path to fruit from the funnel into the hose 30.

In accordance with the present invention, adjustable opening 50 is provided in the funnel 40 between its rim 42 and base 48 whereby the hand of the user may enter into the funnel area through its sidewall. This opening 50 is preferably adjustable by means of Velcro fasteners 52 to fit, fruit-tight, about the wrist of the user.

Thus, as best shown in FIG. 4, the hand of the user is positioned within the funnel 40 and functions as part of the funnel as seen by the picked fruit, but with the thumb and first three fingers free and clear of the funnel and capable of reaching upward of the rim 42.

This construction has a decided advantage since the funnel and hose structure provides very little or no interference with the hand of the picker in reaching fruit, yet allows him or her to easily propel or drop fruit picked into the funnel 40 with little chance of loss.

OPERATION

In use, the aid device 12 is easily secured at a comfortable position on the side, preferably at the thigh as shown by use of the adjustable straps 20 and 16.

The hose 30 is then secured to the forearm as shown by the strap 36 and with the hand positioned over funnel 40. The little finger is then inserted in the rings 46 and the Velcro portions 52 closely surround the wrist of the user and are fastened together.

The picker is now ready to use the device in picking fruit which he may reach and pick in the normal way using his thumb and first three fingers. The picked fruit can be released or propelled into the funnel 40. If the picker is picking fruit from a high position, the fruit would normally fall by gravity through the funnel into the hose 30 and through it into the container 14. The positions of the funnel and hose behind the extended fingers and thumb provide for ease of picking fruit which naturally springs backward and downward into the funnel as it snaps off the bush or tree.

When picking fruit from a low position, the fruit will gather in the funnel and opening of the hose 30. The picker need only periodically raise his arm to send this fruit down the hose 30 and into the container 14.

While one particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. The improvement in a picker's aid device of the type for handling picked fruit or like items, comprising:
   a funnel member having an exit opening therein,
   said funnel having a rim defining an entry opening, means for securing the rim about the hand from the smallest finger to the wrist, such that the thumb and primary fingers are free to extend above the plane of the funnel rim and not tied thereto and may when extended reach above the rim, and
   said entry opening being held open by support means encorporated in the funnel extending between the funnel rim and the exit opening
   so that fruit or like items may be easily and naturally picked and dropped or propelled into the funnel by the hand, but the thumb and primary fingers of the hand is not materially impeded by the funnel.

2. The invention as defined in claim 1 wherein said funnel includes means defining a hand opening between the rim and the exit opening for allowing the hand to enter into the funnel, said hand opening fitting the user closely so as not to allow fruit to fall through the hand opening.

3. The invention of claim 1 wherein said support means is a spring wire secured in the wall of the funnel which wire extends between the rim and the exit opening.

4. A picker's aid device comprising:
   a flexible, elongated hose, being constructed so as to be transversely crush-resistant, said hose having an open end;
   means for releasably affixing the hose along the forearm of a picker with the open end near the wrist of the picker;
   a flexible funnel member attached to the open end of the hose and formed to open thereinto, said funnel having a rim, support means extending between said rim and said open end of said hose to maintain the funnel open and also including means for securing the rim about the hand from the smallest finger to the wrist, such that the thumb and primary fingers are free of attachment to the rim and funnel member and may extend above the plane of the funnel rim so that picked fruit may be easily dropped and propelled into the funnel and hose by the free thumb and primary fingers which are not materially impeded by the funnel.

5. The invention as defined in claim 4 wherein said funnel includes means defining a hand opening between the rim and the opening into said hose for allowing the hand to enter into the funnel opening, said hand opening means fitting the user closely so as not to allow fruit to fall through that hand opening.

6. The invention of claim 4 wherein said support means is a wire secured in the wall of the funnel which wire extends between said rim and said open end of said hose.

* * * * *